United States Patent Office 3,291,831
Patented Dec. 13, 1966

3,291,831
N-CYCLOALKENIC DERIVATIVES OF NITROANILINES AND A METHOD FOR THE PREPARATION THEREOF
John P. Luvisi, Park Ridge, Ill., assignor to Universal Oil Products Company, Des Plaines, Ill., a corporation of Delaware
No Drawing. Filed Dec. 26, 1963, Ser. No. 333,735
20 Claims. (Cl. 260—576)

This application is a continuation-in-part of my co-pending application Serial No. 91,653 filed February 27, 1961 and my co-pending application, Serial No. 91,654 filed February 27, 1961, both said earlier applications being now abandoned.

This invention relates to new compositions of matter and to a method for the preparation thereof. More specifically, the invention relates to a method for the preparation of N-cycloalkenic derivatives of nitroanilines and to the compounds themselves.

It has now been discovered that new compositions of matter comprising N-cycloalkenic derivatives of nitroanilines may be prepared by condensing an unsaturated conjugated compound such as an alkadiene or cycloalkadiene containing only carbon, hydrogen and halogen atoms with a nitroaniline containing only carbon, hydrogen, nitrogen and oxygen atoms, said latter compound containing, as the sole additional functional group, an olefinic hydrocarbon side chain on the amino radical. The condensation products which are obtained in this Diels-Alder type reaction will find a wide variety of uses in the chemical field. For example, the compounds of the present invention which are halo substituted cycloalkadienic derivatives may be employed as insecticides, said insecticides being effective against many insects, and especially house flies. For example, the condensation product of cyclopentadiene and N-allyl-2,4-dinitroaniline, namely, N - (2-norbornen-5-ylmethyl)-2,4-dinitroaniline may be used as an intermediate in the preparation of an insecticide, the final product which will possess insecticidal activity being prepared by chlorinating the aforesaid intermediate by any means known in the art such as treatment with chlorine and anhydrous hydrogen chloride, etc. at appropriate temperatures and pressures. Another compound, namely, N-(1,2,3,4,7,7-hexachloro-2-norbornen-5-ylmethyl)-2,4-dinitroaniline which may be prepared by condensing hexachlorocyclopentadiene with N-allyl-2,4-dinitroaniline may be used per se as an effective insecticide against house flies. It is also contemplated that the intermediates which are prepared by condensing an alkadienic or cycloalkadienic hydrocarbon with a nitroaniline may be further condensed with halogenated dienes such as hexachlorocyclopentadiene or 1,2,3,4-tetrachlorobutadiene to prepare products which are useful as insecticides, the final products being especially effective against house flies. In addition, the reaction products of the present invention may also be utilized as intermediates in the preparation of resins, pharmaceuticals, plastics, etc.

For purposes of this invention the term "cycloalkenic" as used hereinafter in the specification and appended claims will refer to cycloalkenic, bicycloalkenic, halo substituted cycloalkenic and halo substituted bicycloalkenic derivatives of nitroanilines.

It is therefore an object of this invention to prepare novel compositions of matter which are useful in the chemical industry.

A further object of this invention is to prepare novel compositions of matter comprising N-cycloalkenic derivatives of nitro substituted anilines.

Taken in its broadest aspect, one embodiment of this invention resides in an N-cycloalkenic derivative of a nitro substituted aniline selected from the group consisting of:

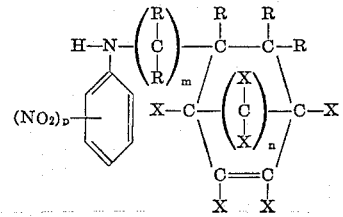

and

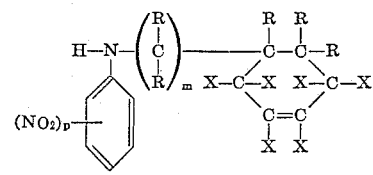

in which the R substituents are selected from the group consisting of hydrogen, haloalkyl and alkyl radicals, the last two radicals containing from 1 to about 6 carbon atoms, the X substituents are selected from the group consisting of hydrogen, halogen, haloalkyl and alkyl radicals, $m$ ranges from 0 to about 6, $n$ is an integer of from 1 to 2 and $p$ is an integer from 1 to 3.

Another embodiment of this invention resides in a process for the preparation of an N-cycloalkenic derivative of a nitroaniline which comprises condensing a nitro substituted aniline containing, as the sole reactive substituent, an olefinic hydrocarbon chain of from 2 to about 7 carbon atoms on the amino radical with an unsaturated compound selected from the group consisting of (1) alkadienes having the generic formula:

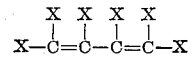

in which the X substituents are selected from the group consisting of hydrogen, halogen, haloalkyl and alkyl radicals, the last two named radicals containing from 1 to about 6 carbon atoms, and (2) a cycloalkadiene containing the generic formula:

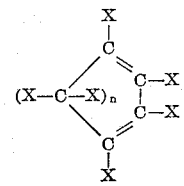

in which the X substituents are selected from the group consisting of hydrogen, halogen, haloalkyl and alkyl radicals, the last two named radicals containing from 1 to about 6 carbon atoms, $n$ is an integer of from 1 to 2, the halogen radicals of both unsaturated compounds being selected from the group consisting of chlorine, bromine and iodine, at a temperature in the range of from about atmospheric to about 300° C. and a pressure in the range of from about atmospheric to about 100 atmospheres, and recovering the desired N-cycloalkenic derivative of a nitroaniline.

A specific embodiment of this invention is found in N-(1,2,3,4,7,7-hexachloro-2-norbornen - 5 - ylmethyl)-o-nitroaniline.

Another specific embodiment of this invention is found in a process for the preparation of an N-cycloalkenic derivative of a nitroaniline which comprises condensing N-allyl-2,4-dinitroaniline with cyclopentadiene at a temperature in the range of from about 100° to about 200° C. and at a pressure in the range of from about atmospheric to about 50 atmospheres, and recovering the resultant N-(2-norbornen-5-ylmethyl)-2,4-dinitroaniline.

Other objects and embodiments will be found in the following further detailed description of this invention.

As hereinbefore set forth, the reaction products of the Diels-Alder type process of the present invention may be used per se or as intermediates in the preparation of compositions of matter possessing insecticidal properties. In addition, the aforesaid reaction product may be hydrogenated, thus reducing the nitro substituent to amino substituent, the latter compositions of matter finding use as antioxidants or antiozonants per se, or, in the alternative, may be reductively alkylated with ketones to yield final products which also possess antioxidant or antiozonant properties. These products, as hereinbefore set forth, may be utilized for the stabilization of various organic materials which are adversely effected by oxygen with the resultant formation of undesirable gums, discoloration, rancidity and/or other deleterious reaction products including motor fuel, jet fuel, diesel oil, mineral oil, lubricating oil, fuel oil, drying oil, greases, waxes, rubber, edible fats and oils, etc. It is also contemplated within the scope of this invention that the Diels-Alder reaction products may be further condensed with aldehydes such as salicylaldehyde in such a manner to form Schiff bases which may afford solid, insoluble fixed bed type copper deactivators for removal of trace metals from gasolines.

As previously mentioned the reaction products may be halogenated, and particularly chlorinated if said reaction products do not originally contain any halogen substituents, to form compounds which possess insecticidal activity. The physical properties of the resultant halogenated compounds thus prepared and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agents, to the mixture of components. The latter solvents and dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

Conjugated diolefinic compounds both alkadienic and cycloalkadienic in configuration which may be reacted with the nitro substituted aniline containing, as the sole reactive substituent, an unsaturated hydrocarbon chain on the amino radical, according to the process of the present invention include straight chain diolefins having the general formula:

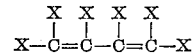

in which the X substituents are radicals selected from the group consisting of hydrogen, halogen, halo alkyl and alkyl radicals, the last two named radicals containing from 1 to about 6 carbon atoms and the halogen radicals being selected from the group consisting of chloride, bromine and iodine and conjugated cycloalkadienes having the generic formula:

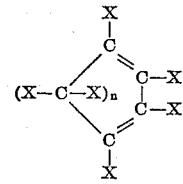

in which the X substituents are of the same nature as those hereinbefore set forth and $n$ is an integer of from 1 to 2 include 1,3-butadiene, 2,3-dimethyl-1,3-butadiene, 2 - methyl - 1,3 - pentadiene, 2,3 - dimethyl - 1,3 - pentadiene, 3 - ethyl - 1,3 - pentadiene, 3 - methyl - 2,4 - hexadiene, 3 - ethyl - 2,4 - hexadiene, 1,3 - hexadiene, 3-methyl - 1,3 - hexadiene, 3 - ethyl - 1,3 - hexadiene, 2,4-heptadiene, 4-methyl-2,4-heptadiene, 3-ethyl-2,4-heptadiene, 3,4 - diethyl - 2,4 - heptadiene, 2 - methyl-1,3 - heptadiene, 2,3 - dimethyl - 1,3 - heptadiene, 3 - ethyl-1,3 - heptadiene, 3 - butyl - 1,3 - heptadiene, 4 - pentyl-2,4 - heptadiene, etc.; cycloalkadienes and alkyl substituted cycloalkadienes such as 1,3-cyclopentadienes which for purposes of this invention will be designated as cyclopentadienes and include cyclopentadiene, 1 - methylcyclopentadiene, 2 - methylcyclopentadiene, 5 - methylcyclopentadiene, 1,2 - dimethylcyclopentadiene, 1,3 - dimethylcyclopentadiene, 5,5 - dimethylcyclopentadiene, 1,2,3-trimethylcyclopentadiene, 1,2,3,4 - tetramethylcyclopentadiene, hexamethylcyclopentadiene, 1-ethylcyclopentadiene, 2 - ethylcyclopentadiene, 5 - ethylcyclopentadiene, 1,2-diethylcyclopentadiene, 1,3 - diethylcyclopentadiene, 5,5-diethylcyclopentadiene, 1,2,3 - triethylcyclopentadiene, 1,2,3,4 - tetraethylcyclopentadiene, hexaethylcyclopentadiene, etc. It is also contemplated within the scope of this invention that conjugated cyclohexenes such as 1,3-cyclohexadiene, 1 - methyl - 1,3 - cyclohexadiene, 2-methyl - 1,3 - cyclohexadiene, 5 - methyl - 1,3 - cyclohexadiene, 1,2 - dimethyl - 1,3 - cyclohexadiene, 1,3 - dimethyl-1,3 - cyclohexadiene, 1,4 - dimethyl - 1,3 - cyclohexadiene, 5,6 - dimethyl - 1,3 - cyclohexadiene, 1,2,3 - trimethyl-1,3 - cyclohexadiene, 1,2,4 - trimethyl - 1,3 - cyclohexadiene, 1,4,5 - trimethyl - 1,3 - cyclohexadiene, 1,5,6 - trimethyl - 1,3 - cyclohexadiene, etc., may also be used although not necessarily with equivalent results. Halo substituted diolefinic compounds which may be used include halo alkadienes such as 1-chloro-1,3-butadiene, 1 - bromo - 1,3 - butadiene, 1,3 - diiodo - 1,3 - butadiene, 1,1,3 - tribromo - 1,3 - butadiene, 1,2 - diiodo - 1,3 - butadiene, 1,1,2 - trichloro - 1,3 - butadiene, 1,1,2 - triiodo- 1,3 - butadiene, 1,1,4 - tribromo - 1,3 - butadiene, 1,1,4,4-tetrachloro - 1,3 - butadiene, 1,1,4,4 - tetraiodo - 1,3 - butadiene, 1,1,2,3 - tetrabromo - 1,3 - butadiene, 1,3 - dichloro-2 - methyl - 1,3 - butadiene, 1,1,4 - trichloro - 2 - methyl-1,3 - butadiene, 1,4 - dichloro - 2 - dichloromethyl - 1,3-butadiene, 1,1,4,4 - tetrachloro - 2 - methyl - 1,3 - butadiene, 1,3 - dibromo - 2 methyl - 1,3 - butadiene, 1,1,4-tribromo - 2 - methyl - 1,3 - butadiene, 1,4 - dibromo - 2-dibromomethyl - 1,3 - butadiene, 1,1,4,4 - tetrabromo - 2-methyl - 1,3 - butadiene, 1,3 - diiodo - 2 - methyl - 1,3-butadiene, 1,4 - diiodo - 2 - methyl - 1,3 - butadiene, 1,1,4-triiodo - 2 - methyl - 2,3 - butadiene, 1,1,4,4 - tetraiodo-2 - iodomethyl - 1,3 - butadiene, etc.; halocycloalkadienes such as halogenated 1,3-cyclopentadienes which for purposes of this invention will be designated as halogenated cyclopentadienes including 1-chlorocyclopentadiene, 1,2,3-trichlorocyclopentadiene, hexachlorocyclopentadiene, 1-bromocyclopentadiene, 1,2,3 - tribromocyclopentadiene, hexabromocyclopentadiene, 1 - iodocyclopentadiene, 1,2,3-triiodocyclopentadiene, hexaiodocyclopentadiene, 1-chloro - 3 - methylcyclopentadiene, 5,5 - dichloro - 3 - methylcyclopentadiene, 1 - chloro - 3 - ethylcyclopentadiene, etc. It is also contemplated within the scope of this invention that polyhalo substituted conjugated cyclohexadienes such as 1,2 - dichloro - 1,3 - cyclohexadiene, 1,2,3 - trichloro-1,3 - cyclohexadiene, octachloro - 1,3 - cyclohexadiene, etc.; 1,2 - dibromo - 1,3 - cyclohexadiene, 1,2,3 - tribromo-1,3 - cyclohexadiene, octabromo - 1,3 - cyclohexadiene, 1,2 - diiodo - 1,3 - cyclohexadiene, 1,2,3 - triiodo - 1,3-cyclohexadiene, octaiodo - 1,3 - cyclohexadiene, etc., may also be used. In addition, it is also contemplated that polyhaloalkadienes and polyhalocycloalkadienes which are used in this process may contain more than one species of halo substituents, such as, for example, 1,1-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene,
1-chloro-2-bromocyclopentadiene,
1,2-dichloro-3-bromocyclopentadiene,
1,2-dichloro-5,5-dibromocyclopentadiene, etc., may be used although not necessarily with equivalent results.

Nitro substituted anilines containing an olefinic hydrocarbon side chain of from 2 to about 7 carbon atoms as the sole additional functional group on the amino radical, said group containing only carbon and hydrogen atoms, which may be used in the process of this invention has the generic formula:

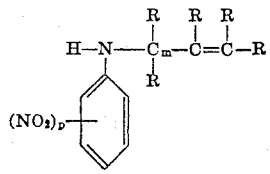

in which the R radicals are selected from the group consisting of hydrogen and alkyl radicals containing from 1 to about 6 carbon atoms, $m$ ranges from 0 to about 6, and $p$ is an integer of from 1 to 3 include N-vinyl-o-nitroaniline,
N-vinyl-p-nitroaniline,
N-allyl-m-nitroaniline,
N-methallyl-o-nitroaniline,
N-methallyl-p-nitroaniline,
N-crotonyl-m-nitroaniline,
N-(1-methyl-4-pentenyl)-o-nitroaniline,
N-(1-methyl-4-pentenyl)-p-nitroaniline,
N-(2,3-dimethyl-4-pentenyl)-m-nitroaniline,
N-(2-methyl-4-pentenyl)-o-nitroaniline,
N-(2-methyl-4-pentenyl)-p-nitroaniline,
N-(1-methyl-3-pentenyl)-m-nitroaniline,
N-(3-methyl-3-pentenyl)-o-nitroaniline,
N-(3-methyl-3-pentenyl)-p-nitroaniline,
N-(1,2-dimethyl-3-pentenyl)-m-nitroaniline,
N-(2,3-dimethyl-3-pentenyl)-o-nitroaniline,
N-2,3-dimethyl-3-pentenyl)-p-nitroaniline,
N-(1-methyl-2-pentenyl)-m-nitroaniline,
N-(2-methyl-2-pentenyl)-o-nitroaniline,
N-(2-methyl-2-pentenyl)-p-nitroaniline,
N-(3-methyl-2-pentenyl)-m-nitroaniline,
N-(1,2-dimethyl-2-pentenyl)-o-nitroaniline,
N-(1,2-dimethyl-2-pentenyl)-p-nitroaniline,
N-(3-hexenyl)-m-nitroaniline,
N-(4-hexenyl)-o-nitroaniline,
N-(4-hexenyl)-p-nitroaniline,
N-(5-hexenyl)-m-nitroaniline,
N-(2-methyl-3-hexenyl)-o-nitroaniline,
N-(2-methyl-3-hexenyl)-p-nitroaniline,
N-(3-methyl-3-hexenyl)-m-nitroaniline,
N-(4-methyl-3-hexenyl)-o-nitroaniline,
N-(4-methyl-3-hexenyl)-p-nitroaniline,
N-(5-methyl-3-hexenyl)-m-nitroaniline,
N-(1-methyl-4-hexenyl)-o-nitroaniline,
N-(1-methyl-4-hexenyl)-p-nitroaniline,
N-(2-methyl-4-hexenyl)-m-nitroaniline,
N-(3-methyl-4-hexenyl)-o-nitroaniline,
N-(3-methyl-4-hexenyl)-p-nitroaniline,
N-(1-methyl-6-hexenyl)-o-nitroaniline,
N-(1-heptenyl)-m-nitroaniline,
N-(2-heptenyl)-o-nitroaniline,
N-(2-heptenyl)-p-nitroaniline,
N-(3-heptenyl)-m-nitroaniline,
N-(4-heptenyl)-o-nitroaniline,
N-(4-heptenyl)-p-nitroaniline,
N-(7-heptenyl)-o-nitroaniline, etc.;
N-allyl-2,4-dinitroaniline,
N-crotonyl-2,4-dinitroaniline,
N-(2-pentenyl)-2,4-dinitroaniline,
N-(3-hexenyl)-2,4-dinitroaniline,
N-vinyl-2,4,6-trinitroaniline,
N-methallyl-2,4,6-trinitroaniline,
N-(1-pentenyl)-2,4,6-trinitroaniline,
N-(1-hexenyl)-2,4,6-trinitroaniline,
N-(1-heptenyl)-2,4,6-trinitroaniline, etc.

It is also contemplated within the scope of this invention that the nitro substituted aniline may contain two unsaturated side chains on the amino radical such as N,N- diallyl-o-nitroaniline, N,N-diallyl-2,4-dinitroaniline, etc. It is to be understood that the aforementioned alkadienes, cycloalkadienes and nitro substituted anilines containing an olefinic side chain as the sole additional functional group are only representatives of the class of compounds which may be used and that the present invention is not necessarily limited thereto.

The process of this invention, which is a Diels-Alder type reaction by nature, in which the nitro substituted aniline containing, as the sole reactive substituent, an unsaturated hydrocarbon chain on the amino radical is condensed with an alkadiene, halo substituted alkadiene, cycloalkadiene or halo substituted cycloalkadiene of the type hereinbefore set forth, will take place at a temperature in the range of from about atmospheric (25° C.) to about 300° C. or more and often preferably at a temperature in the range of from about 100° to about 225° C., the temperature depending upon the reactants which are to be condensed. Generally, the reaction will also be affected at atmospheric pressure; however, if higher temperatures are to be employed when condensing a lower boiling diolefinic compound with the nitro substituted aniline, superatmospheric pressures ranging from about 2 to about 100 atmospheres will be used. The superatmospheric pressure is usually provided by the introduction of an inert gas such as nitrogen into the reaction vessel, the amount of pressure used being necessary to maintain a major portion of the reactants in the liquid phase. In addition, if so desired, the reaction may also be effected in the presence of a substantially inert organic solvent or diluent including aromatic hydrocarbons such as benzene, toluene, o-xylene, m-xylene, p-xylene, ethyl benzene, etc.; saturated aliphatic hydrocarbons such as pentane, hexane, heptane, etc.; saturated cyclic hydrocarbons such as cyclopentane, methylcyclopentane, cyclohexane, etc.; alcohols such as methyl alcohol, ethyl alcohol, propyl alcohol, etc., or ethers such as dimethyl ether, diethyl ether, dipropyl ether, etc.

One example of the condensation reaction of the present process may be illustrated by the following equations in which N-allyl-o-nitroaniline is reacted with hexachlorocyclopentadiene and 2,3-dichloro-1,3-butadiene, respectively:

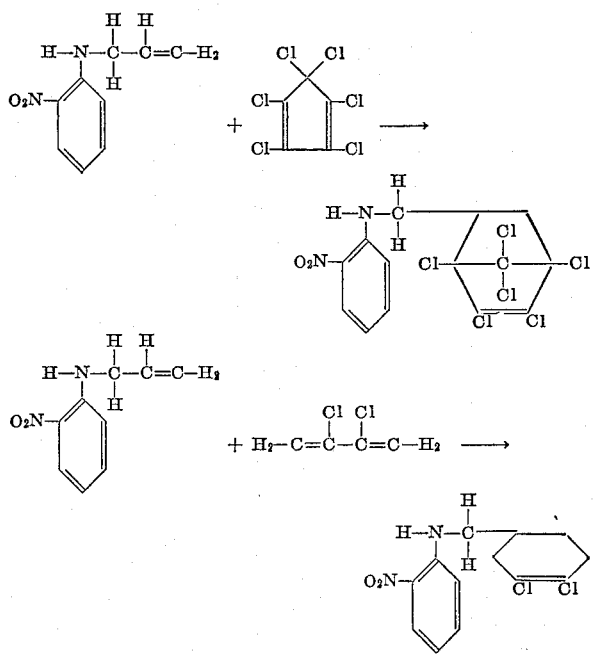

Another example of the condensation reaction for the present process may be illustrated by the following equations in which N-allyl-o-nitroaniline is condensed with cyclopentadiene and 1,3-butadiene, respectively:

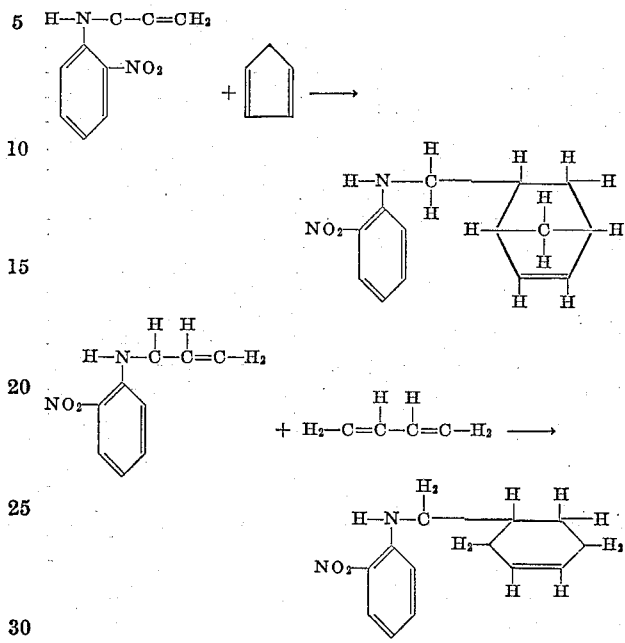

A process of the present invention may be effected in any suitable manner and may comprise either a batch or continuous type operation. For example, when a batch type operation is used, the quantity of the starting materials comprising the nitro substituted aniline containing an olefinic side chain as the sole additional function group, said group containing only carbon and hydrogen atoms and being attached to the amino radical is placed in a condensation apparatus provided with heating and mixing means. If so desired, an inert organic solvent of the type hereinbefore set forth in greater detail is also added thereto. The flask is adjusted to the desired temperature and the conjugated alkadiene or cycloalkadiene containing only carbon and hydrogen atoms or the halo alkadiene or halo cycloalkadiene containing only carbon, hydrogen and halogen atoms is added thereto at a predetermined rate, the temperature of the flask being maintained at the desired level for a predetermined residence time. At the end of this time the flask and contents thereof are allowed to cool to room temperature and the desired reaction product is separated from unreacted starting materials by conventional means such as fractional distillation, crystallization, etc. Alternatively, the reactants and solvents may be first admixed and then heated to the desired reaction temperature.

Another method of effecting a condensation reaction of the present invention is by a continuous type operation. In this type of operation the starting materials comprising the nitro substituted aniline containing an olefinic side chain on the amino radical as the sole additional functional group and the diolefinic compound are continuously charged to the reactor which is maintained at the proper operating conditions of temperature and pressure. If so desired, inert organic solvents of the type hereinbefore set forth may be added through a separate line or admixed with one or the other of the starting materials prior to entry into said reactor and charged thereto in a single line. The reaction product is continuously withdrawn from the reactor, separated from the reactor effluent and purified by conventional means hereinbefore set forth while the unreacted starting materials are separated and recharged to the reactor as a portion of the feed stock.

The examples of the Diels-Alder reaction products which are prepared according to the present process are those having the generic formulas:

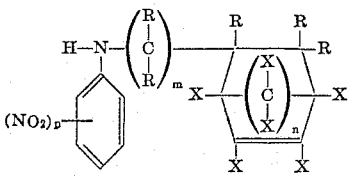

and

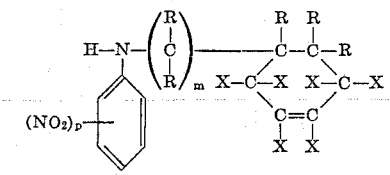

in which the R substituents are selected from the group consisting of hydrogen, haloalkyl and alkyl radicals, the last two radicals containing from 1 to about 6 carbon atoms, the X substituents are selected from the group consisting of hydrogen, halogen, haloalkyl and alkyl radicals, $m$ ranges from 0 to about 6, $n$ is an integer of from 1 to 2 and $p$ is an integer from 1 to 3. Specific examples of these compounds include N-(1-cyclohexen-4-yl)-o-nitroaniline,
N-(1-cyclohexen-4-yl)-p-nitroaniline,
N-(1-cyclohexen-4-yl)-2,4,6-trinitroaniline,
N-(1-cyclohexen-4-ylmethyl)-m-nitroaniline,
N-(1-cyclohexen-4-ylmethyl)-2,4-dinitroaniline,
N-(2-norbornen-5-yl)-o-nitroaniline,
N-(2-norbornen-5-yl)-p-nitroaniline,
N-(2-norbornen-5-yl)-2,4,6-trinitroaniline,
N-(2-norbornen-5-ylmethyl)-m-nitroaniline,
N-(2-norbornen-5-ylmethyl)-2,4-dinitroaniline,
N-(1-cyclohexen-4-ylethyl)-o-nitroaniline,
N-(1-cyclohexen-4-ylethyl)-p-nitroaniline,
N-(1-cyclohexen-4-ylpentyl)-o-nitroaniline,
N-(1-cyclohexen-4-ylethyl)-2,4,6-trinitroaniline,
N-(1-cyclohexen-4-ylhexyl)-p-nitroaniline,
N-(2-norbornen-5-ylethyl)-m-nitroaniline,
N-(2-norbornen-5-ylethyl)-2,4-dinitroaniline, etc.,
N-(1,2-dichloro-1-cyclohexen-4-yl)-o-nitroaniline,
N-(1,2-dichloro-1-cyclohexen-4-yl)-2,4,6-trinitroaniline,
N-(1,2-dichloro-1-cyclohexen-4-ylmethyl)-m-nitroaniline,
N-(1,2-dichloro-1-cyclohexen-4-ylbutyl)-o-nitroaniline,
N-(1,2-dichloro-1-cyclohexen-4-ylhexyl)-p-nitroaniline,
N-(1,2-dichloro-1-cyclohexen-4-ylmethyl)-2,4-dinitroaniline,
N-(1,2,3,4,7,7-hexachloro-2-norbornen-5-yl)-o-nitroaniline,
N-(1,2,3,4,7,7-hexachloro-2-norbornen-5-yl)-p-nitroaniline,
N-(1,2,3,4,7,7-hexachloro-2-norbornen-5-yl)-2,4,6-trinitroaniline,
N-(1,2,3,4,7,7-hexachloro-2-norbornen-5-ylmethyl)-m-nitroaniline,
N-(1,2,3,4,7,7-hexachloro-2-norbornen-5-ylhexyl)-o-nitroaniline,
N-(1,2,3,4,7,7-hexachloro-2-norbornen-5-ylmethyl)-2,4-dinitroaniline,
N-(1,2-dibromo-1-cyclohexen-4-yl)-o-nitroaniline,
N-(1,2-dibromo-1-cyclohexen-4-ylmethyl)-m-nitroaniline,
N-(1,2,3,4,7,7-hexabromo-2-norbornen-5-yl)-o-nitroaniline,
N-(1,2,3,4,7,7-hexabromo-2-norbornen-5-ylhexyl)-m-nitroaniline,
N-(1,2,3,4,7,7-hexabromo-2-norbornen-5-yl)-2,4,6-trinitroaniline,
N-(1,2,3,4,7,7-hexabromo-2-norbornen-5-ylmethyl)-2,4-dinitroaniline,
N-(1,2-diiodo-1-cyclohexen-4-ylmethyl)-o-nitroaniline,
N-(1,2-diiodo-1-cyclohexen-4-ylmethyl)-2,4,6-trinitroaniline,
N-(1,2,3,4,7,7-hexaiodo-2-norbornen-5-yl)-2,4-dinitroaniline,
N-(1,2,3,4,7,7-hexaiodo-2-norbornen-5-ylmethyl)-p-nitroaniline, etc. It is to be understood that the aforementioned compounds are only representatives of the class of reaction products which may be prepared and that the present invention is not necessarily limited thereto.

The following examples are given to illustrate the process of the present invention which, however, are not intended to limit the generally broad scope of the present invention in strict accordance therewith.

Example I

A mixture of 48 g. (0.309 mole) of o-nitrochlorobenzene, 42 g. (0.74 mole) of monoallyl amine was dissolved in 84 g. of xylene and heated at a temperature of between 130–140° C. for a period of about 5 hours in a rotating autoclave at an initial pressure of 30 atmospheres of nitrogen. At the end of this time the autoclave and contents thereof were allowed to cool to room temperature and the excess pressure was vented. The crude product consisted of two layers, a clear amber upper layer was washed with water, dried and distilled. The layer was wased with water, dried and distilled. The lower layer which weighed 28.5 g. was added to water after which the aqueous solution was then made basic and extracted with ether. The ether extract was distilled and the cuts boiling at 312–326° C. comprising N-allyl-o-nitroaniline were recovered.

A solution consisting of 17 g. (0.096 mole) of N-allyl-o-nitroaniline, 26 g. (0.096 mole) of hexachlorocyclopentadiene and 52 cc. of xylene was placed in the glass liner of a rotating autoclave. The liner was sealed into the autoclave and 30 atmospheres of nitrogen was pressed in. The autoclave was then heated to a temperature of about 160° C. and maintained thereat for a period of about 5.5 hours. At the end of this time the autoclave and contents thereof were allowed to cool to room temperature and the excess pressure was vented. The product which weighed 85.5 g. consisted of a dark opaque amber liquid containing traces of hydrogen chloride and a black solid. The product was filtered, the filtrate was washed with dilute sodium hydroxide, water, dried and distilled to remove the solvent. There was obtained 41 g. of crystalline bottoms and oil. Purification of the bottoms by washing with Skelly A afforded 30 g. of amber crystalline solid having a melting point of 130° C. The solid was subjected to analysis with the following results. Found: C, 37.53; H, 2.38; N, 6.38; Cl, 47.07. Calcd. for $C_{14}H_{10}Cl_6 N_2O_2$: C, 37.28; H, 2.24; N, 6.21; Cl, 47.07.

The above analyses therefore confirmed the obtention of N-(1,2,3,4,7,7-hexachloro-2-norbornen-5-yl-methyl)-o-nitroaniline.

Example II

A mixture of 101 g. (0.5 mole) of 2,4-dinitrochlorobenzene, 114 g. (2 moles) of allyl amine and 500 cc. of chloroform was placed in a one liter Erlenmeyer flask and immediate reaction occurred. The reaction mixture turned brown and the solution began to boil. After about one hour the reaction subsided and the solution was allowed to stand at room temperature for a period of about 72 hours. Following this an equal volume of benzene was added and the mixture was washed four times with a 1-N-hydrochloric acid. The benzene was then evaporated on a steam bath and the reaction product, comprising 110 g. of N-allyl-2,4-dinitroaniline having a melting point of 77–78 ° C. was obtained.

A mixture consisting of 24 g. (.088 mole) of hexachlorocyclopentadiene, 18 g. (0.081 mole) of N-allyl-2,4-dinitroaniline and 50 cc. of xylene was placed in the glass linear of a rotating autoclave. The liner was sealed into the autoclave and 30 atmospheres of nitrogen was pressed in. The autoclave was then heated to a temperature of 160° C. and maintained thereat for a period of about five hours. At the end of this time the autoclave and contents thereof were cooled to room temperature and the excess pressure was vented. The product comprises 79 g. of black crystalline solid and liquid. The product was then filtered, the crystalline residue having a melting point of 130–150° C. Removal of the solvent from the filtrate yielded 39.5 g. of crystals and oil. After washing the product with Skelly A and after subsequent filtration there was obtained 34 g. of an amber crystalline solid, said solid having a melting point of 135–143° C. The crystals which comprised N-(1,2,3,4,7,7-hexachloro-2-norbornen-5-ylmethyl)-2,4-dinitroaniline was analyzed with the following results.

Found: Cl, 42.26. Calcd. for $C_{14}H_9Cl_6N_3O_4$: Cl, 42.64.

The total yield of adduct was 37 g. which was 98% of the theoretical yield. The reason that the product did not have a sharp melting point was due to the mixture of isomers that could be present in the product due to the number of asymmetric carbon atoms in the molecule.

*Example III*

In this example a solution of 18 g. (0.081 mole) of N-allyl-2,4-dinitroaniline, 11 g. (0.088 mole) of 2,3-dichloro-1,3-butadiene and 50 cc. of xylene is placed in the glass liner of a rotating autoclave which is then sealed into the autoclave. Nitrogen is then pressed in until an initial pressure of 50 atmospheres is reached following which the autoclave is then slowly heated to a temperature of about 160° C. and maintained thereat for a period of about five hours. At the end of this time the autoclave and contents thereof are cooled to room temperature, and the excess pressure is vented. The reaction product is recovered and filtered. The filtrate is made basic, washed, dried and extracted with ether. The ether extract is then subjected to fractional distillation under reduced pressure and the cuts comprising N-(1,2-dichloro-1-cyclohexen-4-ylmethyl)-2,4-dinitroaniline are separated and recovered.

*Example IV*

In this example a solution consisting of 17 g. (0.096 mole) of N-allyl-o-nitroaniline and 12 g. (0.096 mole) of 1,2-dichloro-1,3-butadiene along with 50 cc. of xylene is placed in the glass liner of a rotating autoclave. The liner is sealed into the autoclave and nitrogen passed in until an initial pressure of 50 atmospheres is reached. Following this the autoclave and contents thereof are slowly heated to a temperature of about 160° C. and maintained thereat for a period of about five hours. At the end of this time the autoclave and contents thereof are cooled to room temperature and the excess pressure is vented. The reaction product is recovered and subjected to the same treatment as hereinbefore set forth in the above examples. Upon distillation under reduced pressure of the ether extract the cuts comprising N-(1,2-dichloro-1-cyclohexen-4-ylmethyl)-o-nitroaniline are separated and recovered.

*Example V*

In this example a solution containing equal molecular proportions of hexachlorocyclopentadiene and N-vinyl-2,4-dinitroaniline prepared by reaction of vinyl chloride with 2,4-dinitroaniline along with xylene is subjected to the same procedure as that set forth in Examples I to IV above. After distillation under reduced pressure the desired reaction product comprising N-(1,2,3,4,7,7-hexachloro-2-norbornen-5-yl)-2,4-dinitroaniline is separated and recovered.

*Example VI*

A mixture of 48 g. (0.309 mole) of o-nitrochlorobenzene and 42 g. (0.74 mole) of monoallylamine was dissolved in 84 cc. of xylene and heated at a temperature of between 130° and 140° C. for a period of about five hours in a rotating autoclave under 30 atmospheres of initial nitrogen pressure. At the end of this time the autoclave and contents thereof were allowed to cool to room temperature and the excess pressure was vented. The crude product consisted of two layers, a clear amber upper layer and a dark opaque amber lower layer. The upper layer was washed with water, dried, distilled, and the cuts boiling at 312–326° C. comprising N-allyl-o-nitroaniline were recovered. The lower layer was added to water, almost all of said layer dissolving therein. Following this the aqueous solution was then made basic and extracted with ether to recover unreacted starting materials.

A solution of 11 g. (0.062 mole) of N-allyl-o-nitroaniline and 4.5 g. (0.062 mole) of freshly made cyclopentadiene along with 22 g. of toluene was placed in the glass liner of a rotating autoclave. The liner was sealed into the autoclave and nitrogen pressed in until an initial pressure of 30 atmospheres was reached. The autoclave and contents thereof were slowly heated to a temperature of about 140° C. and maintained thereat for a period of six hours. At the end of this time the autoclave and contents thereof were cooled to room temperature, the excess pressure was vented and the reaction product comprising 43 g. of a dark opaque amber liquid was recovered. Upon fractional distillation under reduced pressure the cut boiling at 158–172° C. at 0.2–0.5 mm. pressure (380° C. at 760 mm. pressure) was recovered. Analysis of this cut, which comprised N-(2-norbornen-5-ylmethyl)-o-nitroaniline was made with the following results.

Found: N, 11.68. Calcd. for $C_{14}H_{16}N_2O_2$: N, 11.47.

*Example VII*

A mixture of 101 g. (0.5 mole) of 2,4-dinitrochlorobenzene, 114 g. (2 moles) of monoallylamine and 500 cc. of chloroform was placed in a 1 liter Erlenmeyer flask. An immediate reaction occurred, the reaction mixture turned brown and then the solution began to boil. When the reaction had subsided after a period of about one hour the mixture was allowed to stand at room temperature for a period of about 72 hours. An equal volume of benzene was then added and the mixture was washed four times with hydrochloric acid. Upon evaporation of the benzene on a steam bath there was obtained 110 g. of N-allyl-2,4-dinitroaniline having a melting point of 77–78° C., the yield amounting to a 99% conversion to the product.

A mixture of 20 g. (0.08 mole) of N-allyl-2,4-dinitroaniline and 5 g. (0.08 mole) of cyclopentadiene along with 25 cc. of toluene is placed in the glass liner of a rotating autoclave. The liner is sealed into the autoclave and nitrogen pressed in until an initial pressure of 30 atmospheres is reached. The autoclave is then slowly heated to a temperature of about 140° C. and maintained thereat for a period of about five hours. At the end of this time the autoclave and contents thereof are allowed to cool to room temperature, the excess pressure is vented and the reaction product is recovered and subjected to fractional distillation. The cut comprising N-(2-norbornen-5-ylmethyl)-2,4-dinitroaniline is separated and recovered.

*Example VIII*

In this example N-allyl-o-nitroaniline is prepared in a manner similar to that set forth in Example VI above, that is, by heating a mixture of o-nitrochlorobenzene, monoallylamine and xylene at a temperature of about 140° C. and a pressure of about 30 atmospheres for a period of about five hours.

The desired product is then prepared by heating 11.4 g. of 0.064 mole) of N-allyl-o-nitroaniline in 50 cc. of xylene to which was added under pressure 3.5 g. (0.064 mole) of 1,3-butadiene in a rotating autoclave at a temperature of about 160° C. and a pressure of about 30 atmospheres. At the end of the desired residence time the autoclave and contents thereof are cooled to room temperature and the excess pressure is vented. The reaction product is recovered, washed, dried and extracted with ether. Following this the ether extract is subjected to fractional distillation and the desired product comprising N-(1-cyclohexen-4-ylmethyl)-o-nitroaniline is separated and recovered.

*Example IX*

In this example N-allyl-2,4-dinitroaniline is prepared in a manner similar to that set forth in Example VII above, that is, by condensing 2,4-dinitrochlorobenzene with monoallylamine. The desired reaction product is then prepared by condensing 15.5 g. (0.070 mole) of N-allyl-2,4-dinitroaniline in 50 cc. of xylene with 3.5 g. (0.064 mole) of 1,3-butadiene, the mixture being heated in a rotating autoclave to a temperature of 160° C. under an initial pressure of 30 atmospheres of nitrogen. At the end of the desired residence time the autoclave and contents thereof are cooled to room temperature, the excess pressure is vented and the reaction product is treated in a manner similar to that set forth in the above examples. The desired product comprising N-(1-cyclohexen-4-ylmethyl)-2,4-dinitroaniline is separated and recovered from the fractional distillation.

*Example X*

One reactant in this example is prepared by condensing 2,4-dinitrochloroaniline with vinylbromide in the presence of potassium carbonate. The desired product comprising N-vinyl-2,4-dinitroaniline is recovered and 14.7 g. (0.070 mole) of this product is condensed with 4.2 g. (0.064 mole) of cyclopentadiene at a temperature of about 160° C. and an initial pressure of 30 atmospheres for a period of about five hours. At the end of this time the reaction product, comprising N-(2-norbornen-5-yl)-2,4-dinitroaniline is recovered in a manner similar to that set forth above.

*Example XI*

An insecticidal solution is prepared by dissolving 1 g. of N-(1,2,3,4,7,7-hexachloro-2-norbornen-5-ylmethyl)-o-nitroaniline in 1 cc. of benzene and adding the resultant solution to 100 g. of water using 1 cc. of Triton X-100 as an emulsifying agent. The resulting solution is sprayed into a cage containing house flies and will cause a 100% knockdown. Similar insecticidal solutions utilizing the compounds set forth in Example II to V above will show similar results.

*Example XII*

Equal molecular proportions of the compound prepared in Example I set forth above, namely, N-(2-norbornen-5-ylmethyl)-o-nitroaniline and hexachlorocyclopentadiene are condensed to form the desired product, namely, N-[(1,2,3,4,10,10-hexachloro-1,4,5,8-dimethano - 1,4,5,5a,6, 7,8,8a - octahydro-6-naphthyl)methyl]-o-nitroaniline. An insecticidal solution is prepared by dissolving 1 g. of this product in 2 cc. of benzene and adding 100 cc. of water using Triton X-100 as an emulsifying agent. This solution is sprayed into a cage containing common house flies and causes a 100% knockdown. Similar tests with other compounds prepared according to Examples VII to X and thereafter chlorinated or condensed with hexachlorocyclopentadiene will show similar results.

I claim as my invention:

1. An N-cycloalkenic derivative of a nitro substituted aniline selected from the group consisting of:

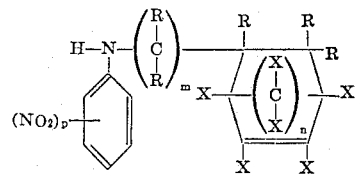

and

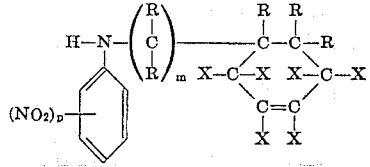

in which the R substituents are selected from the group consisting of hydrogen and lower alkyl radicals, the X substituents are selected from the group consisting of hydrogen, chloro, bromo, iodo, mono- and di-, chloro-, bromo- and -iodo-methyl and lower alkyl radicals, $m$ ranges from 0 to about 6, $n$ is an integer of from 1 to 2 and $p$ is an integer from 1 to 3.

2. N-(1,2,3,4,7,7 - hexachloro - 2 - norbornen - 5-ylmethyl)-o-nitroaniline.

3. N-(1,2,3,4,7,7 - hexachloro - 2 - norbornen - 5-ylmethyl)-2,4-dinitroaniline.

4. N-(1,2 - dichloro - 1 - cyclohexen - 4 - ylmethyl)-(o-nitroaniline).

5. N-(1,2 - dichloro - 1 - cyclohexen - 4 - ylmethyl)-(2,4-dinitroaniline).

6. N-(1,2,3,4,7,7 - hexachloro - 2 - norbornen - 5-yl)-o-nitroaniline.

7. N-(2-norbornen-5-ylmethyl)-o-nitroaniline.

8. N-(2 - norbornen - 5 - ylmethyl) - 2,4 - dinitroaniline.

9. N-(1 - cyclohexen - 4 - ylmethyl)-o-nitroaniline.

10. N-(1 - cyclohexen - 4 - ylmethyl) - 2,4 - dinitroaniline.

11. N-(2-norbornen-5-yl)-o-nitroaniline.

12. A process for the preparation of an N-cycloalkenic derivative of a nitroaniline which comprises condensing a nitro substituted aniline containing, as the sole reactive substituent, an olefinic hydrocarbon chain of from 2 to about 7 carbon atoms on the amino radical with an unsaturated compound selected from the group consisting of (1) alkadienes having the generic formula:

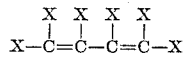

in which the X substituents are selected from the group consisting of hydrogen, halogen, haloalkyl and alkyl radicals, the last two named radicals containing from 1 to about 6 carbon atoms, and (2) a cycloalkadiene containing the generic formula:

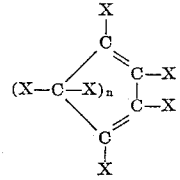

in which the X substituents are selected from the group consisting of hydrogen, halogen, haloalkyl and alkyl radicals, the last two named radicals containing from 1 to about 6 carbon atoms, $n$ is an integer of from 1 to 2, the halogen radicals of both unsaturated compounds being selected from the group consisting of chlorine, bromine and iodine, at a temperature in the range of from about atmospheric to about 300° C. and a pressure in the range of from about atmospheric to about 100 atmospheres, and recovering the desired N-cycloalkenic derivative of a nitroaniline.

13. A process for the preparation of an N-halocycloalkenic derivative of a nitroaniline which comprises condensing N-allyl-o-nitroaniline with hexachlorocyclopentadiene at a temperature in the range of from about 100° to about 200° C. and at a pressure in the range of from about atmospheric to about 50 atmospheres, and recovering the desired N-(1,2,3,4,7,7-hexachloro-2-norbornen-5-ylmethyl)-o-nitroaniline.

14. A process for the preparation of an N-halocycloalkenic derivative of a nitroaniline which comprises condensing N-allyl-2,4-dinitroaniline with hexachlorocyclopentadiene at a temperature in the range of from about 100° to about 200° C. and at a pressure in the range of from about atmospheric to about 50 atmospheres, and recovering the desired N-(1,2,3,4,7,7-hexachloro-2-norbornen-5-ylmethyl)-2,4-dinitroaniline.

15. A process for the preparation of an N-halocycloalkenic derivative of a nitroaniline which comprises condensing N-allyl-o-nitroaniline with 2,3-dichloro-1,3-butadiene at a temperature in the range of from about 100° to about 200° C. and at a pressure in the range of from about atmospheric to about 50 atmospheres, and recovering the desired N-(1,2-dichloro-1-cyclohexen-4-ylmethyl)-o-nitroaniline.

16. A process for the preparation of an N-halocycloalkenic derivative of a nitroaniline which comprises condensing N-allyl-2,4-dinitroaniline with 2,3-dichloro-1,3-butadiene at a temperature in the range of from about 100° to about 200° C. and at a pressure in the range of from about atmospheric to about 50 atmospheres, and recovering the desired N-(1,2-dichloro-1-cyclohexen-4-ylmethyl)-2,4-dinitroaniline.

17. A process for the preparation of an N-cycloalkenic derivative of a nitroaniline which comprises condensing N-allyl-o-nitroaniline with cyclopentadiene at a temperature in the range of about 100° to about 200° C. and at a pressure in the range of from about atmospheric to about 50 atmospheres, and recovering the resultant N-(2-norbornen-5-ylmethyl)-o-nitroaniline.

18. A process for the preparation of an N-cycloalkenic derivative of a nitroaniline which comprises condensing N-allyl-2,4-dinitroaniline with cyclopentadiene at a temperature in the range of from about 100° to about 200° C. and at a pressure in the range of from about atmospheric to about 50 atmospheres, and recovering the resultant N-(2-norbornen-5-ylmethyl)-2,4-dinitroaniline.

19. A process for the preparation of an N-cycloalkenic derivative of a nitroaniline which comprises condensing N-allyl-o-nitroaniline with 1,3-butadiene at a temperature in the range of from about 100° to about 200° C. and at a pressure in the range of from about atmospheric to about 50 atmospheres, and recovering the resultant N-(1-cyclohexen-4-ylmethyl)-o-nitroaniline.

20. A process for the preparation of an N-cycloalkenic derivative of a nitroaniline which comprises condensing N-allyl-2,4-dinitroaniline with 1,3-butadiene at a temperature in the range of from about 100° to about 200° C. and at a pressure in the range of from about atmospheric to about 50 atmospheres, and recovering the resultant N-(1-cyclohexen-4-ylmethyl)-2,4-dinitroaniline.

References Cited by the Examiner

UNITED STATES PATENTS

| | | | |
|---|---|---|---|
| 2,894,993 | 7/1959 | Schmerling | 260—578 XR |
| 2,952,712 | 9/1960 | Roberts et al. | 260—650 |

OTHER REFERENCES

Adams et al., "Organic Reactions," Vol. 4, pp. 3–4 (1948).

CHARLES B. PARKER, *Primary Examiner.*

ROBERT V. HINES, *Assistant Examiner.*